Dec. 22, 1931.  C. G. BAKER  1,837,890
SWIVEL CONNECTION FOR ELECTRIC CABLES
Filed May 16, 1929
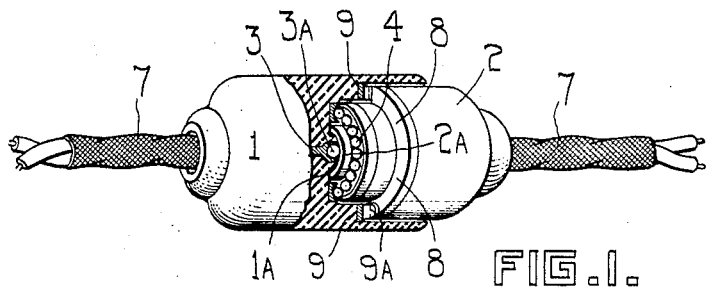
FIG. 1.
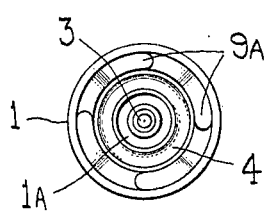
FIG. 2.
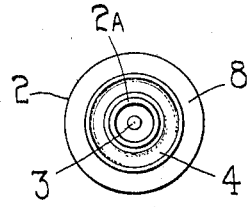
FIG. 3.
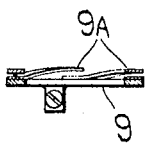
FIG. 4.
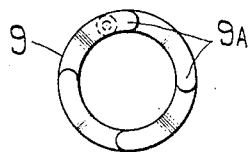
FIG. 5.
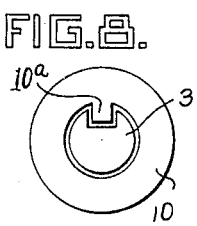
FIG. 8.
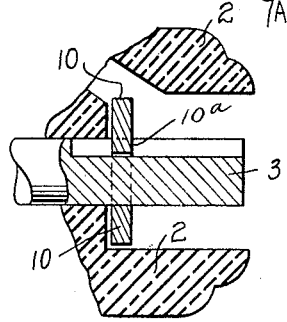
FIG. 7.
FIG. 6.
INVENTOR
C. G. Baker,
BY
Langner, Parry, Card & Langner
ATTYS.

Patented Dec. 22, 1931

1,837,890

UNITED STATES PATENT OFFICE

CHARLES GOATER BAKER, OF TIMARU, NEW ZEALAND

SWIVEL CONNECTION FOR ELECTRIC CABLES

Application filed May 16, 1929. Serial No. 363,490.

This invention relates to swivel fittings for insertion in or use in connection with flexible electric cables and the like, whereby the latter can be turned and moved about without twisting or knotting, said fitting being freely turnable while permitting an uninterrupted flow of electricity through same and the cable.

According to the invention the device comprises a pair of non-conducting members, preferably round in section and held in axial alignment with each other by means of a centrally articulated or universally jointed spindle or shaft passed through their centres. Nuts on the ends of this spindle retain the non-conducting members in position, while a ball race positioned concentrically with and around the spindle is provided between the inner or adjacent ends of the non-conducting members for the purpose of reducing friction between them as much as possible and allowing the said non-conducting members to rotate freely and independently of each other about the spindle.

The spindle itself forms one conductor for the passage of electricity through the device and the other conductor comprises a metal ring having a plurality of light spring wiping contacts secured on the inner end of one of the non-conducting members adapted to maintain continuous electric contact with a smooth faced annular metal inset on the adjoining face of the other non-conducting member.

The invention will be further described with reference to the accompanying drawings, wherein :—

Figure 1 is a longitudinal sectional elevation of the complete device.

Figure 2 is a view of the inner end of one of the non-conducting members, and

Figure 3 is a similar view of the inner end of the other non-conducting member, while, Figures 4 and 5 are a sectional elevation and plan view respectively of the spring metal electric wipe contact.

The device provided by this invention comprises a pair of members 1 and 2 formed of suitable electric non-conducting material such as ebonite, porcelain, or the like, the size and exterior shape of such members being immaterial, although they are preferably of cylindrical or substantially cylindrical form.

The members 1 and 2 are positioned in axial alignment so that their inner ends are adjacent but not in actual contact with each other.

A spindle 3 formed in two sections, united at the centre by means of a ball and socket joint 3ª, is passed through the centres of the members 1 and 2, one half or section of the spindle 3 being positioned in the member 1 and the other half or section in the member 2, the ball and socket joint 3ª being located at or near the inner or adjoining ends of the members 1 and 2.

Concentrically with and around the spindle 3 there is provided between the inner ends of the members 1 and 2 a ball race 4 adapted to facilitate the easy and independent rotation of the said members 1 and 2, and the latter are held in proper relation to each other by means of suitable nuts 5 on either end of the spindle 3.

The spindle 3 provides one path for the conduction of the electric current through the device, and for this purpose one of the wires 7 of the cable is attached to either end of the said spindle 3 by being clamped between the nuts 5 and further nuts 5A outside the latter.

The other wire 7A of the cable is divided, one of its ends being led and connected to a smooth faced metal ring 8 in the inner end of the member 2 while its other end is connected to a metal ring 9 in the inner end of the member 1, the rings 8 and 9 being positioned concentrically around the spindle 3 and directly opposite each other.

Spring wipe contacts 9A on the ring 9 are adapted to press lightly on the face or outer surface of the ring 8 and provide continuous electric contact therewith, thus enabling current to be passed between the ends of the wire 7A independently of any turning movement which may be given to the members 1 or 2.

By this means complete electrical connection is maintained between the ends of the wires 7 and 7A so that should either of the latter be twisted or turned, the members 1 and 2 can absorb such movement by turning or swivelling freely in relation to each other and so preventing twisting or knotting of the cable as occurs at present.

The device as provided hereby can be inserted in flexible wires or cables used in lighting extensions, in telephone cords and the like, and the casing 3 can, if desired, be formed integrally with or be attached to an outlet socket, telephone base or the like. Suitably designed it can also be used in electric supply cables for electric drills and other portable machinery or tools of a like nature, to prevent twisting and consequent wear of such supply cables.

In order to prevent any possibility of arcing or short circuiting of the electric current between the ball joint 3A of the central spindle 3 and the adjacent and concentric ball race 4, a groove 1A is provided around said ball joint 3A in the face of the member 1, while a corresponding tongue or projecting ring 2A is provided on the inner face of the member 2 and is adapted to enter said groove 1A.

Metal washers 10 placed on the outer ends of the spindle portions 3 between the ends of the members 1 and 2 and the nuts 5, are provided with tongues or feathers 10A adapted to enter longitudinal slots 11 in the said spindles for the purpose of preventing turning of the said washers 10 on the spindles 3.

What I claim as new and desire to secure by Letters Patent is:—

1. A swivel connection for electric cables, comprising a pair of substantially cylindrical members mounted in axial alignment with each other upon a central spindle and independently rotatable with respect to each other, a metallic ball-bearing between their adjacent ends, a smooth faced metal ring set in the inner end of one of said members, and arranged concentrically about the said spindle, a ring set in the inner face or end of the other member and having spring metal tongues adapted to wipe or press against the surface of said first-mentioned metal ring, nuts screwed on the ends of the central spindle to retain the rotatable cylindrical members thereon, means for connecting the wires of the electric cable to the ends of the central spindle and to the metal rings in the cylindrical members, and a ball and socket joint in the middle of said spindle enabling the adjacent end of the said cylindrical members to ensure even pressure of the members on the ball-bearing positioned between them.

2. A swivel connection for electric cables, comprising a pair of substantially cylindrical members mounted independently rotatable and in axial alignment with each other upon a central spindle, the said spindle having longitudinally extending grooves therein adjacent its ends, a metallic ball-bearing between the adjacent ends of the members, a smooth faced metal ring set in the inner end of one of said members concentric with said spindle, a ring set in the inner face or end of the other member and having spring metal tongues adapted to wipe or press against the surface of said first mentioned metal ring, nuts threaded on the ends of the said spindle to retain the cylindrical members thereon, means for connecting the wires of the electric cable to the end of the central spindle and to the metal rings in the cylindrical members, and washers on said spindle between said nuts and said members, having feathers engaging in said grooves of the spindle and a ball and socket joint in the middle of said spindle, enabling the adjacent end of the said cylindrical members to ensure even pressure of the members on the ball-bearing positioned between them.

In testimony whereof I have affixed my signature this 28th day of March, 1929.

CHARLES GOATER BAKER.